(12) United States Patent
Gleason

(10) Patent No.: US 9,960,589 B1
(45) Date of Patent: May 1, 2018

(54) STOVETOP TIMER KIT

(71) Applicant: James Gleason, Lakewood, CO (US)

(72) Inventor: James Gleason, Lakewood, CO (US)

( * ) Notice: Subject to any disclaimer, the term of this patent is extended or adjusted under 35 U.S.C. 154(b) by 212 days.

(21) Appl. No.: 15/077,449

(22) Filed: Mar. 22, 2016

(51) Int. Cl.
*H02H 3/08* (2006.01)
*H02H 3/087* (2006.01)
*H02H 9/02* (2006.01)
*H02H 3/10* (2006.01)
*H02H 7/20* (2006.01)
*H05B 1/02* (2006.01)
*F24C 7/08* (2006.01)

(52) U.S. Cl.
CPC ............ *H02H 3/08* (2013.01); *F24C 7/088* (2013.01); *H02H 7/20* (2013.01); *H05B 1/0202* (2013.01); *H05B 1/0258* (2013.01)

(58) Field of Classification Search
CPC ............ H02H 3/08; H02H 3/087; H02H 9/02; H02H 3/10
USPC ........................................................ 361/93.1
See application file for complete search history.

(56) References Cited

U.S. PATENT DOCUMENTS

| D246,159 S | 10/1977 | Podall |  |
|---|---|---|---|
| 5,734,206 A * | 3/1998 | Keizer | F24C 7/08 |
|  |  |  | 200/50.09 |
| 5,945,017 A | 8/1999 | Cheng |  |
| 6,130,413 A | 10/2000 | Rak |  |
| 6,294,994 B1 * | 9/2001 | Hoellerich | F24C 7/08 |
|  |  |  | 219/490 |
| 7,002,109 B2 * | 2/2006 | Klask | H05B 3/683 |
|  |  |  | 219/445.1 |
| 2002/0113062 A1 | 8/2002 | Cranford |  |
| 2004/0251247 A1 * | 12/2004 | Whipple, Jr. | F24C 7/087 |
|  |  |  | 219/395 |
| 2005/0109333 A1 * | 5/2005 | Thomas | F24C 7/082 |
|  |  |  | 126/42 |
| 2010/0142104 A1 * | 6/2010 | Cooper | H02H 3/32 |
|  |  |  | 361/49 |
| 2012/0125910 A1 * | 5/2012 | Shaffer | H01H 19/62 |
|  |  |  | 219/262 |
| 2014/0230661 A1 | 8/2014 | Stilo |  |

FOREIGN PATENT DOCUMENTS

CA        2843244 A1    8/2014

* cited by examiner

*Primary Examiner* — Dharti Patel

(74) *Attorney, Agent, or Firm* — Kyle A. Fletcher, Esq.

(57) ABSTRACT

The stovetop timer kit is an aftermarket circuit interrupt device adapted for use with electric stoves. The stovetop timer kit uses a current transducer that senses the current flow to the burners and oven of the electric stove. A microcontroller monitors the current flow through the current transducer and when an overcurrent situation is sensed the microcontroller cuts off electric current flow to the burners and oven of the electric stove. The microcontroller is a programmable device that is used to control and operate the device. The stovetop timer kit comprises a control module and an interrupt circuit.

8 Claims, 5 Drawing Sheets

STOVETOP TIMER KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The stovetop timer kit is an aftermarket circuit interrupt device adapted for use with electric stoves. The stovetop timer kit uses a current transducer that senses the current flow to the burners and oven of the electric stove. A microcontroller monitors the current flow through the current transducer and when an overcurrent situation is sensed the microcontroller cuts off electric current flow to the burners and oven of the electric stove. The microcontroller is a programmable device that is used to control and operate the device.

SUMMARY OF INVENTION

The stovetop timer kit is an aftermarket circuit interrupt device adapted for use with electric stoves. The stovetop timer kit uses a current transducer that senses the current flow to the burners and oven of the electric stove. A microcontroller monitors the current flow through the current transducer and when an overcurrent situation is sensed the microcontroller cuts off electric current flow to the burners and oven of the electric stove. The microcontroller is a programmable device that is used to control and operate the device.

These together with additional objects, features and advantages of the stovetop timer kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the stovetop timer kit in detail, it is to be understood that the stovetop timer kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the stovetop timer kit.

It is therefore important that the claims be regarded as including such equivalent construction insofar as they do not depart from the spirit and scope of the stovetop timer kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
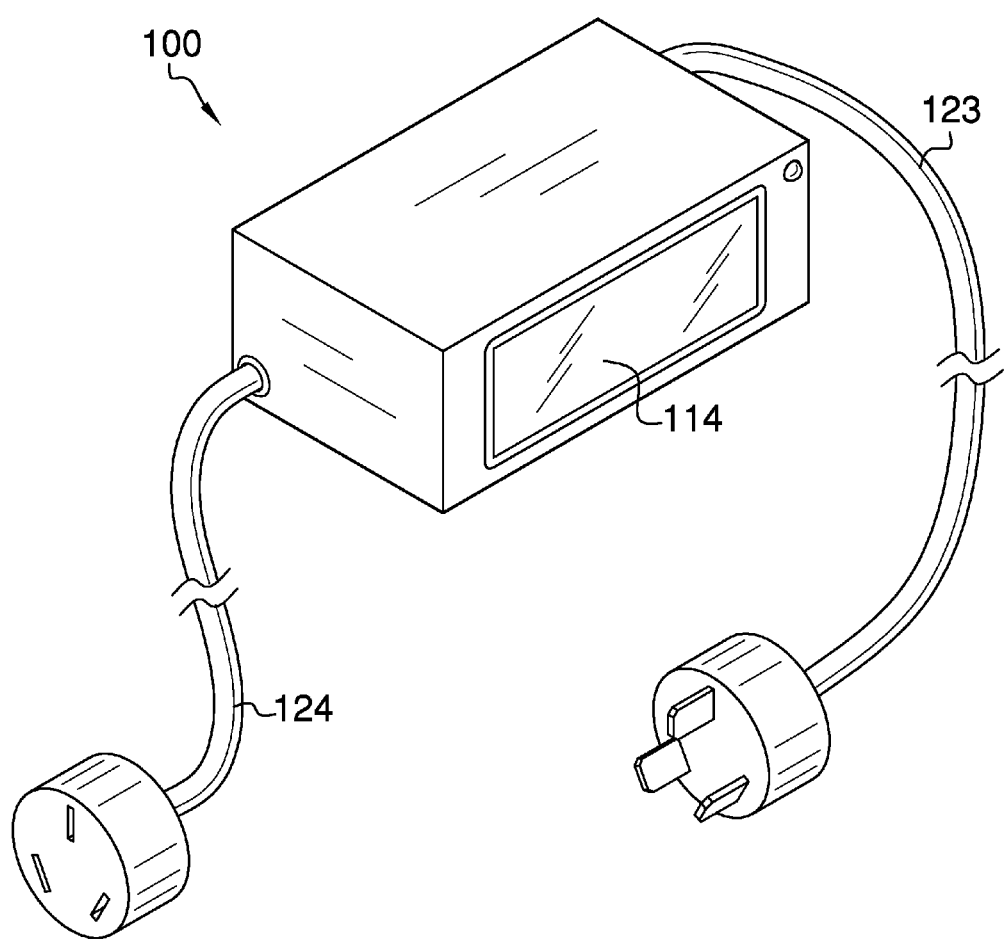
FIG. 1 is a perspective view of an embodiment of the disclosure.
Figure 2:
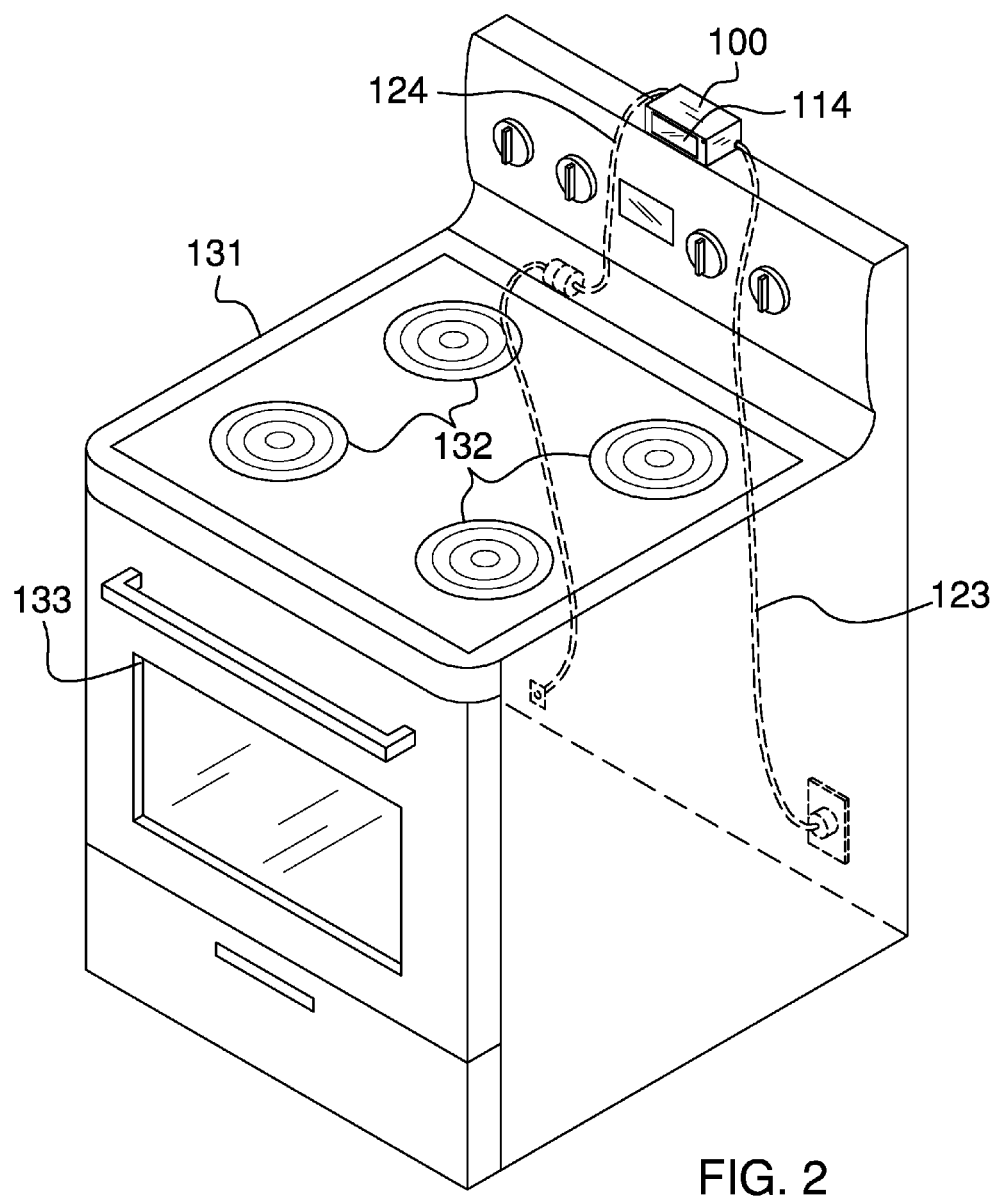
FIG. 2 is an in use view of an embodiment of the disclosure.
Figure 3:
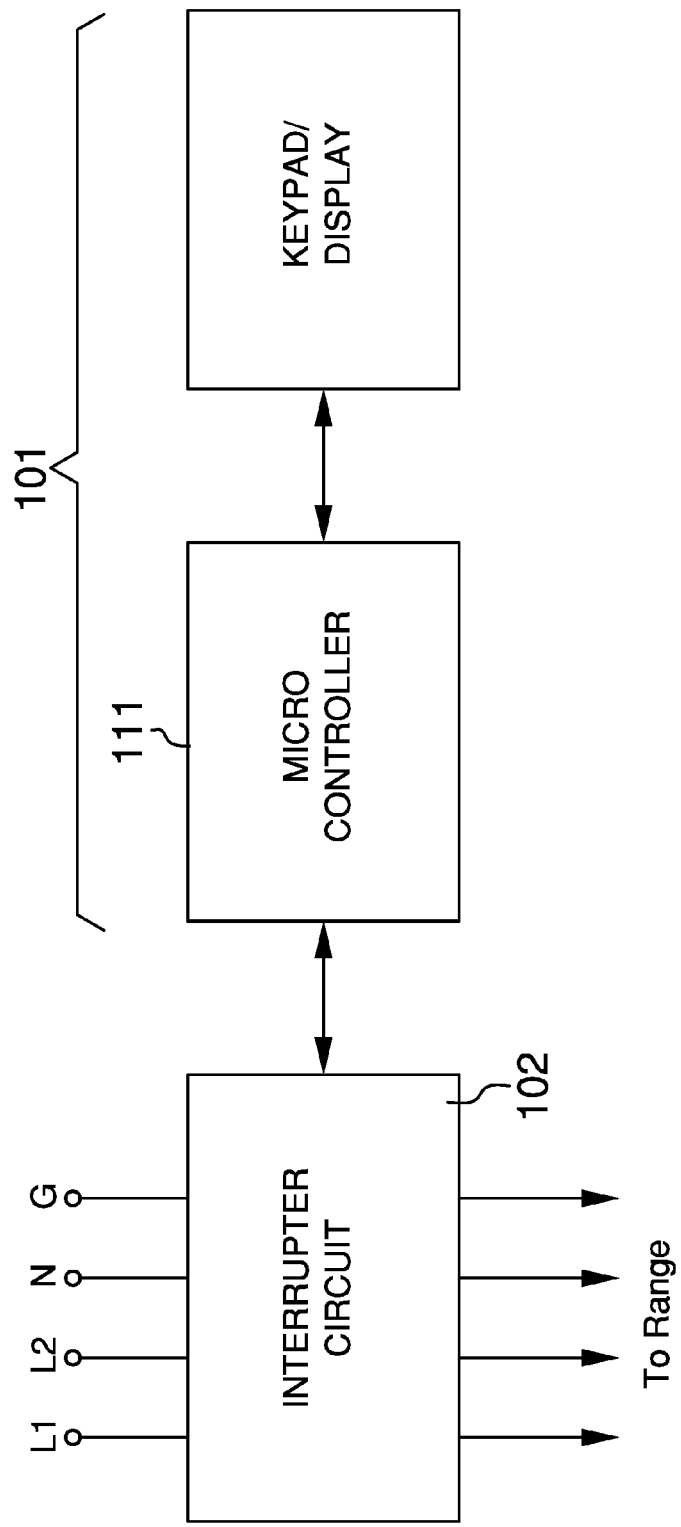
FIG. 3 is a block diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5.

The stovetop timer kit 100 (hereinafter invention) comprises a control module 101 and an interrupt circuit 102. The invention 100 is an aftermarket circuit interrupt device adapted for use with electric stoves 131. The invention 100 uses a current transducer 112 that senses the current flow to the burners 132 and oven 133 of the electric stove 131. A microcontroller 111 monitors the current flow through the current transducer 112 and when an overcurrent situation is sensed the microcontroller 111 cuts off electric current flow to the burners 132 and oven 133 of the electric stove 131 but allows the current that powers the lights, clock and fan to continue.

Figure 4:
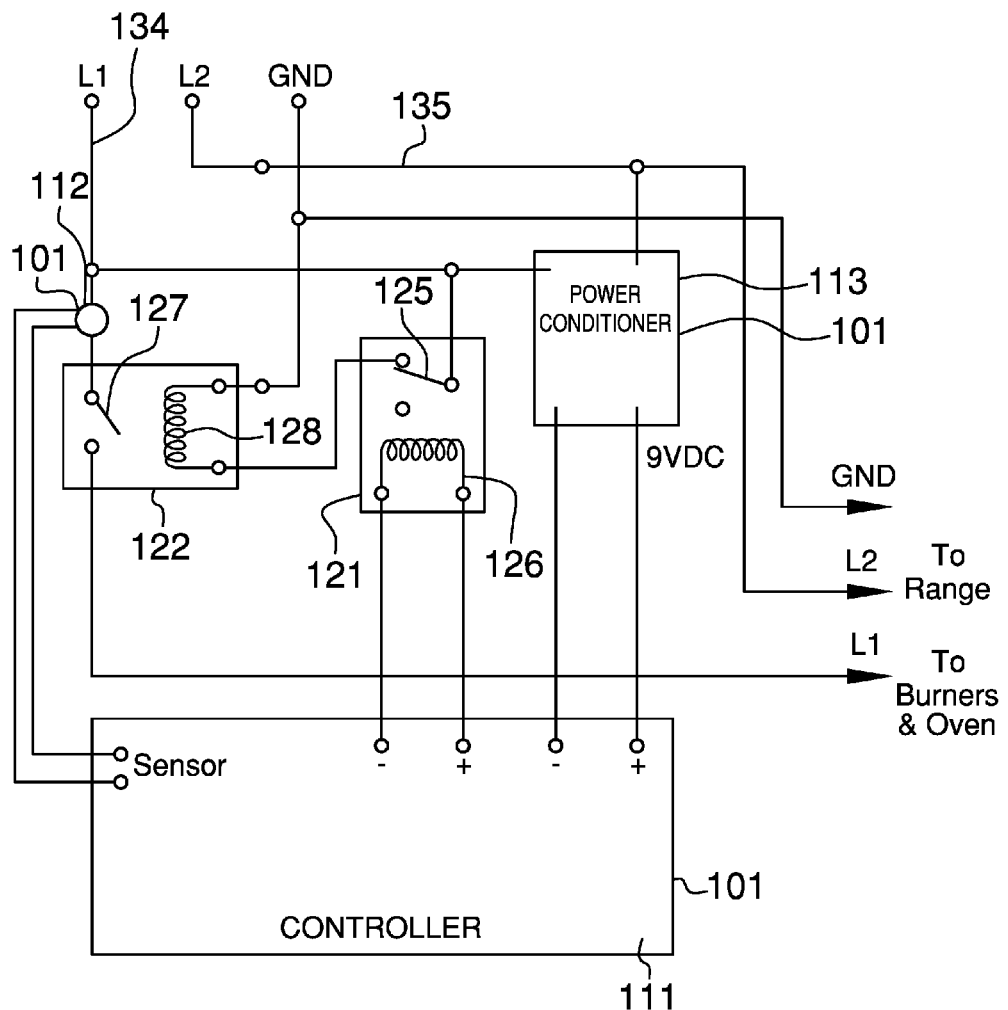
FIG. 4 is a wiring schematic of an embodiment of the disclosure.
Figure 5:
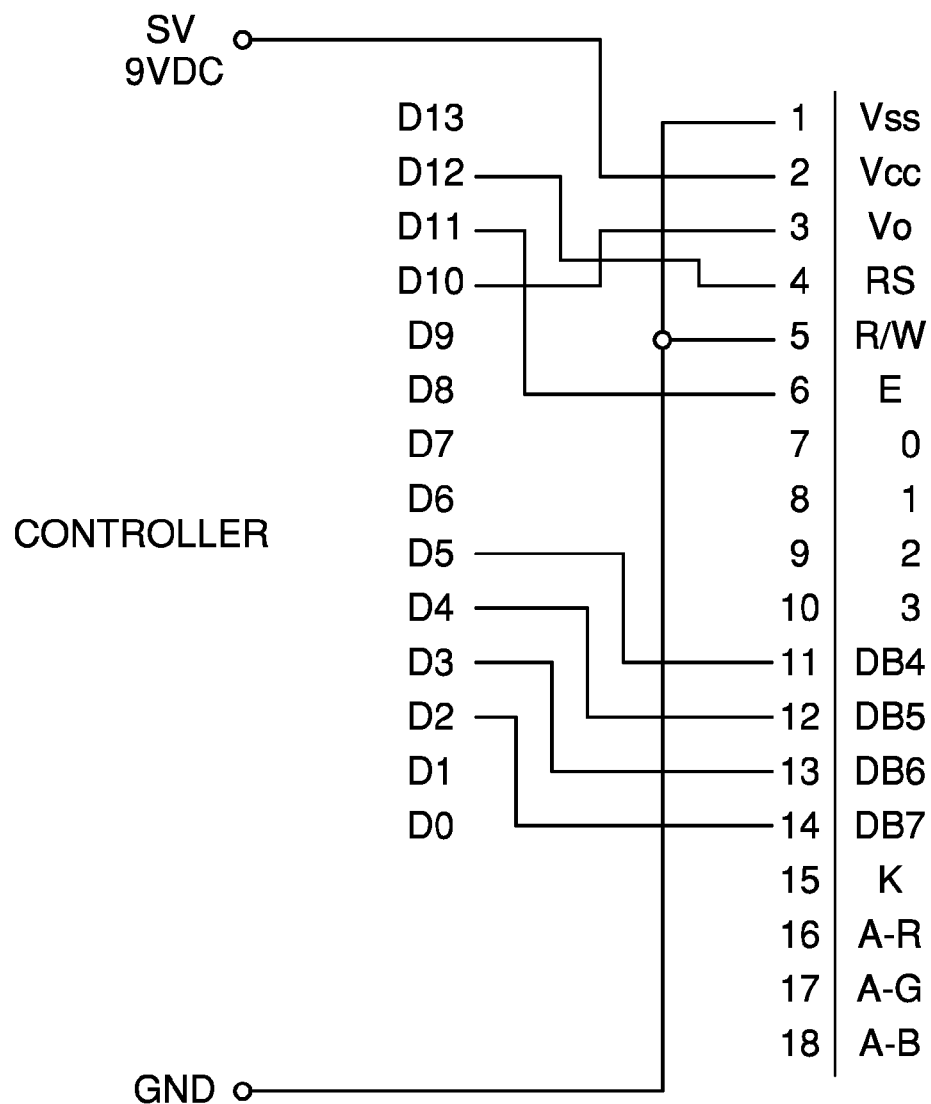
FIG. 5 is a wiring schematic of a detail of an embodiment of the disclosure.

The control module 101 further comprises a microcontroller 111, a current transducer 112, a power conditioner 113, and a data entry display 114. The microcontroller 111 is a programmable device that is used to control and operate the invention 100. As shown in FIG. 4, the microcontroller 111 monitors the current transducer 112. The current transducer 112 is a readily and commercially available induction based current sensor that is wired to monitor the flow of electricity to the burners and 132 and oven 133 of the electric stove 131. The microcontroller 111 is programmed to monitor the level of the electric current flowing through the invention 100 to the burners 132 and oven 133 of the electric stove 131. When the electric current flowing through the invention 100 to the burners 132 and oven 133 of the electric stove 131 exceeds a previously determined threshold level, the microcontroller 111 sends an interrupt signal to a first relay 121 which initiates a sequence implemented through the interrupt circuit 102 to disconnect the electric current flowing through the invention 100 to the burners 132 and oven 133 of the electric stove 131. The first relay 121 and the interrupt circuit 102 are discussed in more detail elsewhere in this disclosure.

The microcontroller 111 is powered using the power conditioner 113. The power conditioner 113 is an AC-DC rectifier and voltage regulator that draws power off one of the electric cables feeding power into the electric stove 131 and to feed conditioned power to the microcontroller 111, the current transducer 112, and the data entry display 114. The data entry display 114 is a touchscreen LCD display that is used to: 1) display the current status of operation of the invention 100 and the electric stove 131; and, 2) allows the previously determined threshold level and other operational parameters of the control module 101 to be programmed while the invention 100 is in use.

The setting of the previously determined threshold level used by can be statically or dynamically determined. A statically determined threshold level is a simple fixed threshold value that is programmed directly into the microcontroller 111 at the time the program is loaded or is loaded directly into the microcontroller 111 through the data entry display 114. If the previously determined threshold level is dynamically determined, the microcontroller 111 is programmed to incorporate prior electric usages and patterns into account as well as indications of circuit failures including, but not limited to, current spikes.

As shown in FIG. 4, the interrupt circuit 102 further comprises a first relay 121, a second relay 122, a power cord 123 and a transfer cord 124. The first relay 121 further comprises a first switch 125 and a first coil 126. The second relay 122 further comprises a second switch 127 and a second coil 128. The first switch 125 is a normally open switch. The second switch 127 is a normally closed switch. In normal operation, electricity flows from the first electric line 134 feeding electricity to the burners 132 and oven 133 of the electric stove 131 through the second switch 127 to the burners 132 and oven 133 of the electric stove 131. If the microcontroller 111 determines that electric current flow to the burners 132 and oven 133 of the electric stove 131 needs to be disconnected the interrupt circuit 102 will open the second switch 127.

The first relay 121 is used as a step up relay. Specifically, the first relay 121 is an intermediate relay that is triggered by the relatively low signal voltage generated by the microcontroller 111. The microcontroller 111 is wired to the first coil 126 of the first relay 121. If the first coil 126 is activated, the first switch 125 is closed. As shown in FIG. 4, when the first switch 125 closes, an electrical connection is completed between the first electric line 134 of the electric stove 131 and the second coil 128. The first electric line 134 of the electric stove 131 provides the higher power needed by the second coil 129 to open the second switch 127 and disconnect electricity flow to the burners 132 and oven 133 of the electric stove 131.

The power cord 123 is used to transfer electric power from the national electric grid to the invention 100. The transfer cord 124 is used to transfer electric power from the invention 100 to the electric stove 131 during operation of the invention 100.

The invention 100 is wired into an electric stove 131 as described elsewhere in this disclosure and any necessary operating parameters are entered through the data entry display 114. The electric stove 131 is then used normally. If a current anomaly is identified by the microcontroller 111, the microcontroller 111 sends a signal to the first relay 121 which disconnects power on the first electric line 134 of the electric stove 131 which powers the burners 132 and the oven 133. The second electric line 135 of the electric stove 131, which powers any lights, clocks, or fans associated with the electric stove 131, remains unaffected.

In the first potential embodiment of the disclosure, the microcontrollers 111, the current transducer 112, power conditioner 113, the data entry display 114, the first relay 121, the second relay 122, the power cord 123, the transfer cord 124 as well as housings, jacks, plugs, and other miscellaneous items associated with the invention 100 are readily and commercially available and were procured commercially.

The following definitions were used in this disclosure:

AC: As used in this disclosure, AC is an acronym for alternating current.

Cable: As used in this disclosure, a cable is a collection of insulated wires covered by a protective casing that is used for transmitting electricity or telecommunication signals.

DC: As used in this disclosure, DC is an acronym for direct current.

Jack: As used in this disclosure, a jack is a port that is designed to receive a plug in order to make an electrical connection.

LCD: As used in this disclosure, LCD is an acronym for Liquid Crystal Display. A liquid crystal display comprises a liquid crystal film placed between two sheets of transparent material. The visual characteristics of the can be varied through the application of a voltage.

Microcontroller: As used in this disclosure, a microcontroller is a small computer, often on a single integrated circuit, containing a processor core, memory, and programmable input/output peripherals.

Relay: As used in this disclosure, a relay is an automatic electromagnetic or electromechanical device that reacts to changes in voltage or current by opening or closing a switch in an electric circuit.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A circuit interrupt device comprising:
   a control module and an interrupt circuit;
   wherein the circuit interrupt device is adapted for aftermarket installation;
   wherein the circuit interrupt device is adapted for use with an electric stove;
   wherein the circuit interrupt device uses a current transducer to senses electric current flow to the burners and oven of the electric stove;

wherein a microcontroller monitors the electric current flow through the current transducer;

wherein when an overcurrent situation is sensed by the microcontroller, the microcontroller disconnects electric current flow to the burners and oven of the electric stove;

wherein when an overcurrent situation is sensed by the microcontroller, the microcontroller does not disconnect the electric current flow to the accessories associated with the electric stove;

wherein the control module comprises a microcontroller, a current transducer, a power conditioner, and a data entry display;

wherein the current transducer is induction based current sensor;

wherein the current transducer is wired to monitor the flow of electricity to the burners and oven of the electric stove;

wherein the power conditioner is an AC-DC rectifier and voltage regulator;

wherein the power conditioner provides electric power to the microcontroller, the current transducer, and the data entry display;

wherein the data entry display is a touchscreen display;

wherein the interrupt circuit comprises a first relay, a power cord and a transfer cord;

wherein the first relay further comprises a first switch and a first coil;

wherein the first switch is a normally closed switch;

wherein the first switch is place in series between the national electric grid and the burners and oven of the electric stove;

wherein when the first coil is powered first switch interrupts electricity flow;

wherein the interrupt circuit further comprises a second relay.

2. The circuit interrupt device according to claim 1 wherein the second relay is configured as a step up relay.

3. The circuit interrupt device according to claim 2 wherein the second relay further comprises a second switch and a second coil.

4. The circuit interrupt device according to claim 3 wherein the second switch is a normally open switch.

5. The circuit interrupt device according to claim 4 wherein the second coil is connected to the microcontroller.

6. The circuit interrupt device according to claim 5 wherein the second switch is placed in series between the national electric grid and the first coil.

7. The circuit interrupt device according to claim 6 wherein the power cord transfers electric power from the national electric grid to the circuit interrupt device.

8. The circuit interrupt device according to claim 7 wherein the transfer cord transfers electric power from the circuit interrupt device to the electric stove.

\* \* \* \* \*